US012155038B2

(12) United States Patent
Moganty et al.

(10) Patent No.: US 12,155,038 B2
(45) Date of Patent: Nov. 26, 2024

(54) MODIFIED IONIC LIQUIDS CONTAINING BICYCLOPHOSPHATE MOIETY

(71) Applicant: Sionic Energy, Inc., Rochester, NY (US)

(72) Inventors: Surya Moganty, Henrietta, NY (US); Yue Wu, West Henrietta, NY (US); Gabriel Torres, Rochester, NY (US); Rutvik Vaidya, Rochester, NY (US); Xiaojing Zhu, Rochester, NY (US); John Sinicropi, Rochester, NY (US)

(73) Assignee: SIONIC ENERGY, INC., Rochester, NY (US)

( * ) Notice: Subject to any disclaimer, the term of this patent is extended or adjusted under 35 U.S.C. 154(b) by 268 days.

(21) Appl. No.: 17/326,482

(22) Filed: May 21, 2021

(65) Prior Publication Data

US 2021/0376386 A1 Dec. 2, 2021

Related U.S. Application Data

(60) Provisional application No. 63/030,384, filed on May 27, 2020.

(51) Int. Cl.
| | | |
|---|---|---|
| *H01M 10/0569* | (2010.01) | |
| *C07F 9/655* | (2006.01) | |
| *H01M 10/0525* | (2010.01) | |
| *H01M 10/0568* | (2010.01) | |
| *H01M 50/414* | (2021.01) | |
| *H01M 50/491* | (2021.01) | |

(52) U.S. Cl.
CPC ..... *H01M 10/0569* (2013.01); *C07F 9/65522* (2013.01); *H01M 10/0525* (2013.01); *H01M 10/0568* (2013.01); *H01M 50/414* (2021.01); *H01M 50/491* (2021.01); *H01M 2300/0028* (2013.01)

(58) Field of Classification Search
CPC ......... H01M 10/0569; H01M 10/0525; H01M 10/0568; H01M 50/414; H01M 50/491; H01M 2300/0028; C07F 9/65522
See application file for complete search history.

(56) References Cited

U.S. PATENT DOCUMENTS

| | | | |
|---|---|---|---|
| 8,828,574 B2 | 9/2014 | Visco et al. | |
| 10,513,598 B2 * | 12/2019 | Ni | ............................ C08L 23/00 |
| 10,720,667 B2 | 7/2020 | Takami et al. | |
| 2015/0333374 A1 * | 11/2015 | Moganty | ............. H01M 10/052 429/328 |
| 2017/0288269 A1 * | 10/2017 | Moganty | ................ H01G 11/64 |
| 2018/0226684 A1 | 8/2018 | Lu et al. | |

FOREIGN PATENT DOCUMENTS

CN 105732717 A 7/2016

OTHER PUBLICATIONS

Chi-Cheung Su, et al. "Functionality selection principle for high voltage lithium-ion battery electrolyte additives." ACS applied materials & interfaces 9.36 (2017): 30686-30695 (Year: 2017).*
International Search Report and Written Opinion for International Patent Application PCT/US2021/033538 (mailed Dec. 20, 2021).
European Patent Application No. 21826531.2 Search Report dated May 23, 2024, 7 pages.

* cited by examiner

*Primary Examiner* — Milton I Cano
*Assistant Examiner* — Albert Michael Hilton
(74) *Attorney, Agent, or Firm* — COZEN O'CONNOR

(57) ABSTRACT

A bicyclophosphate-modified ionic liquid compound, the synthesis thereof, an electrochemical electrolyte containing a bicyclophosphate-modified ionic liquid compound, and energy storage device containing the electrolyte are disclosed.

31 Claims, No Drawings

MODIFIED IONIC LIQUIDS CONTAINING BICYCLOPHOSPHATE MOIETY

FIELD

This disclosure is directed towards an ionic liquid whose cation includes a bicyclophosphate moiety, an electrolyte for electrochemical cells containing the ionic liquid and electrical energy storage devices.

BACKGROUND

Recent progress in synthesis and electrochemical analysis of room temperature ionic liquids (ILs) has established the promise of this unique class of materials as electrolytes for next-generation lithium-ion batteries. TLs are organic salts having melting points below 100° C. and generally consist of a bulky cation and an inorganic anion. The large cation size allows for delocalization and screening of charges, resulting in a reduction in the lattice energy and thereby the melting point or glass transition temperature. ILs have unique physicochemical properties, such as negligible vapor pressure, non-flammability, good room-temperature ionic conductivity, a wide electrochemical window, and favorable chemical and thermal stability. These properties are desirable for providing IL-based electrolytes for lithium batteries.

However, there are still safety challenges such as flammability of lithium-ion batteries under abuse conditions or even normal conditions. Chi-Cheung Su et al. (ACS Appl. Mater. Interfaces 2017, 9, 30686-30695) teaches the use of an electrolyte composition containing cyclic phosphorus compounds, but mentions no use of an ionic liquid, or of an ionic liquid covalently bonded to a moiety comprising bicyclic phosphorus moieties. Therefore, there is a need to incorporate a novel ionic liquid to impart flame retardant capabilities into lithium ion batteries. Further, there is a need to extend the operating voltage to extract more capacity from the Li ion cathodes. The voltage stability of traditional electrolyte solvents can also be extended by addition of ionic liquids, and therefore can be used in Li-ion cells with high voltage cathodes.

SUMMARY

The present disclosure is directed towards an ionic liquid, including anions and cations, wherein the cations have at least one bicyclophosphate moiety.

In accordance with one aspect of the present disclosure, there is provided an electrolyte for use in an electrical storage device, the electrolyte includes an aprotic organic solvent system, a metal salt, (optionally an additive) and an ionic liquid compound that contains at least one bicyclophosphate moiety.

In accordance with another aspect of the present disclosure, there is provided an electrolyte in an electrical energy storage device, the electrolyte includes an aprotic organic solvent system, a metal salt, (optionally an additive) and an ionic liquid compound that contains at least one bicyclophosphate moiety, wherein the organic solvent is open-chain or cyclic carbonates, carboxylic acid esters, nitriles, ethers, sulfones, sulfoxides, ketones, lactones, dioxolanes, glymes, crown ethers, siloxanes, phosphoric acid esters, phosphates, phosphites, mono- or polyphosphazenes or mixtures thereof.

In accordance with another aspect of the present disclosure, there is provided an electrolyte in an electrical energy storage device, the electrolyte includes an aprotic organic solvent system, a metal salt, (optionally an additive) and an ionic liquid compound that contains at least one bicyclophosphate moiety, wherein the cation of the metal salt is aluminum, magnesium or an alkali metal, such as lithium or sodium.

In accordance with another aspect of the present disclosure, there is provided an electrolyte in an electrical energy storage device, the electrolyte including an aprotic organic solvent system, a metal salt, an additive and an ionic liquid compound that contains at least one bicyclophosphate moiety, wherein the additive contains sulfur-containing compounds, phosphorus-containing compounds, boron-containing compounds, silicon-containing compounds, compounds containing at least one unsaturated carbon-carbon bond, carboxylic acid anhydrides or mixtures thereof.

In accordance with another aspect of the present disclosure, there is provided an electrical energy storage device electrolyte including:
a) an aprotic organic solvent system;
b) a metal salt; and
c) an ionic liquid compound including:
an anion (A⁻); and
a cation attached to a bicyclophosphate moiety according to the formula:

wherein:
CAT⁺ is a pyrrolidinium, piperdinium, azepanium, sulfonium, phosphonium, pyridine, imidazolium or a 5- or 6-membered heterocyclic ring having 1 to 3 heteroatoms as ring members including nitrogen, oxygen, silicon or sulfur; and
L is (a) a linker, including a $C_1$-$C_8$ alkyl, alkenyl, alkynyl, alkoxy, ester, carbonyl, phenyl, thioether, sulfoxide, azo or aryl group, wherein any of the carbon or hydrogen atoms therein are optionally further substituted with a halide; (b) O, S, NH, or C; or (c) O, S, NH, or C attached to the linker, with the proviso that when L is an ester group then CAT+ is not an imidazolium.

In accordance with another aspect of the present disclosure, there is provided an ionic liquid compound including:
an anion (A⁻); and
a cation attached to a bicyclophosphate moiety according to the formula:

wherein:
CAT⁺ is a pyrrolidinium, piperdinium, azepanium, sulfonium, phosphonium, pyridine, imidazolium or a 5- or 6-membered heterocyclic ring having 1 to 3 heteroatoms as ring members including nitrogen, oxygen, silicon or sulfur; and
L is (a) a linker, including a $C_1$-$C_8$ alkyl, alkenyl, alkynyl, alkoxy, ester, carbonyl, phenyl, thioether, sulfoxide, azo or aryl group, wherein any of the carbon or hydrogen atoms therein are optionally further substituted with a halide; (b) O, S, NH, or C; or (c) O, S, NH, or C attached to the linker, with the proviso that when L is an ester group then CAT+ is not an imidazolium.

In accordance with another aspect of the present disclosure, there is provided an electrochemical energy storage device including: a cathode; an anode; an electrolyte according to the present disclosure; and a separator.

These and other aspects of the present disclosure will become apparent upon a review of the following detailed description and the claims appended thereto.

DETAILED DESCRIPTION

The present disclosure is directed towards an ionic liquid compound including at least one cation and at least one anion, wherein the at least one cation is covalently bonded to at least one bicyclophosphate moiety, wherein the bicyclophosphate moiety or bicyclic phosphate moiety is represented by the following structure

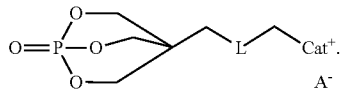

In an embodiment, an electrical energy storage device electrolyte includes a) an aprotic organic solvent system; b) a metal salt; c) optionally an additive; and d) an ionic liquid compound including at least one cation and an at least one anion, wherein at least one cation is covalently bonded to at least one bicyclophosphate moiety.

In an embodiment, an ionic liquid compound includes an anion; and a cation attached to a bicyclophosphate moiety according to the formula:

wherein:
CAT$^+$ is a pyrrolidinium, piperdinium, azepanium, onium, sulfonium, phosphonium, imidazolium, pyridine or a 5- or 6-membered heterocyclic ring having 1 to 3 heteroatoms as ring members including nitrogen, oxygen, silicon or sulfur; and
L is (a) a linker, including a $C_1$-$C_8$ alkyl, alkenyl, alkynyl, alkoxy, ester, carbonyl, phenyl, thioether, sulfoxide, azo or aryl group, wherein any of the carbon or hydrogen atoms therein are optionally further substituted with a halide; (b) O, S, NH, or C; or (c) O, S, NH, or C attached to the linker. In an embodiment, L is (a) a linker, including a $C_1$-$C_8$ alkyl, alkenyl, alkynyl, alkoxy, ester, carbonyl, phenyl, thioether, sulfoxide, azo or aryl group, wherein any of the carbon or hydrogen atoms therein are optionally further substituted with a halide; (b) O, S, NH, or C; or (c) O, S, NH, or C attached to the linker, with the proviso that when L is an ester group then CAT+ is not an imidazolium.

Suitable anions (A$^-$) in accordance with the present disclosure, include but are not limited to halides (e.g., Cl, Br), nitrates (e.g., $NO_3$), phosphates (e.g., $PF_6$, TFOP), imides (e.g., TFSI, BETI), borates (e.g., BOB, $BF_4$), aluminates, arsenides, cyanides, thiocyanates, nitrites, benzoates, carbonates, chlorates, chlorites, chromates, sulfates, sulfites, silicates, thiosulfates, chalcogenides, pnictogenides, crystallogenides, oxalates, acetates, formates, or hydroxides.

The disclosure further includes a method for synthesizing the bicyclophosphate moiety-based cations, and the use of such functionalized cations in an ionic liquid for electrochemical cells. These compounds afford the electrolyte greater thermal stability.

In an embodiment, the electrolyte includes a lithium salt in addition to the ionic liquid. A variety of lithium salts may be used, including, for example, Li[$CF_3CO_2$]; Li[$C_2F_5CO_2$]; Li[$ClO_4$]; Li[$BF_4$]; Li[$AsF_6$]; Li[$PF_6$]; Li[$PF_2(C_2O_4)_2$]; Li[$PF_4C_2O_4$]; Li[$CF_3SO_3$]; Li[$N(CP_3SO_2)_2$]; Li[$C(CF_3SO_2)_3$]; Li[$N(SO_2C_2F_5)_2$]; lithium alkyl fluorophosphates; Li[$B(C_2O_4)_2$]; Li[$BF_2C_2O_4$]; $Li_2$[$B_{12}Z_{12-j}H_j$]; $Li_2$[$B_{10}X_{10-j'}H_{j'}$]; or a mixture of any two or more thereof, wherein Z is independent at each occurrence a halogen, j is an integer from 0 to 12 and j' is an integer from 1 to 10.

In some applications of the present electrolyte, such as a formulation for a lithium ion battery, aprotic solvents are combined with the present ionic liquids to decrease the viscosity and increase the conductivity of the electrolyte. The most appropriate aprotic solvents lack exchangeable protons, including cyclic carbonic acid esters, linear carbonic acid esters, phosphoric acid esters, oligoether substituted siloxanes/silanes, cyclic ethers, chain ethers, lactone compounds, chain esters, nitrile compounds, amide compounds, sulfone compounds, siloxanes, phosphoric acid esters, phosphates, phosphites, mono- or polyphosphazenes and the like. These solvents may be used singly, or at least two of them in admixture. Examples of aprotic solvents or carriers for forming the electrolyte systems include but are not limited to dimethyl carbonate, ethyl methyl carbonate, diethyl carbonate, methyl propyl carbonate, ethyl propyl carbonate, dipropyl carbonate, bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, etc., fluorinated oligomers, methyl propionate, ethyl propionate, butyl propionate, dimethoxyethane, triglyme, dimethylvinylene carbonate, tetraethyleneglycol, dimethyl ether, polyethylene glycols, triphenyl phosphate, tributyl phosphate, hexafluorocyclotriphosphazene, 2-Ethoxy-2,4,4,6,6-pentafluoro-1,3,5,2-5,4-5,6-5 triazatriphosphinine, triphenyl phosphite, sulfolane, dimethyl sulfoxide, ethyl methyl sulfone, ethylvinyl sulfone, allyl methyl sulfone, divinyl sulfone, fluorophenylmethyl sulfone and gamma-butyrolactone.

In some embodiments, the electrolytes further include an additive to protect the electrodes from degradation. Thus, electrolytes of the present technology may include a passivating additive that is reduced or polymerized on the surface of a negative electrode to form a passivation film on the surface of the negative electrode. Likewise, electrolytes can include an additive capable of reacting with or passivating the surface of the positive electrode to form a passivation film on the surface of the positive electrode. The additives capable of forming a layer on the positive electrode will vary based on the cathode material used in in the electrical energy storage device. In some embodiments, electrolytes of the present technology further include mixtures of the two types of passivating additives.

In some embodiments, a passivating additive is a substituted or unsubstituted linear, branched, or cyclic hydrocarbon including at least one oxygen atom and at least one aryl, alkenyl or alkynyl group. The passivating film formed from such additives may also be formed from a substituted aryl compound or a substituted or unsubstituted heteroaryl compound where the additive includes at least one oxygen atom. Alternatively, a combination of two passivating additives may be used. In some such embodiments, one ion and the other additive can be selective for passivating the anode surface to prevent or lessen the reduction of metal ions at the anode.

Representative additives include glyoxal bis(diallyl acetal), tetra(ethylene glycol) divinyl ether, 1,3,5-triallyl-1,3,5-triazine-2,4,6(1H,3H,5H)-trione, 1,3,5,7-tetravinyl-1,3,5,7-tetramethylcyclotetrasiloxane, 2,4,6-triallyloxy-1,3,5-triazine, 1,3,5-triacryloylhexahydro-1,3,5-triazine, 1,2-divinyl furoate, 1,3-butadiene carbonate, 1-vinylazetidin-2-one, 1-vinylaziridin-2-one, 1-vinylpiperidin-2-one, 1-vinylpyrrolidin-2-one, 2,4-divinyl-1,3-dioxane, 2-amino-3-vinylcyclohexanone, 2-amino-3-vinylcyclopropanone, 2-amino-4-vinylcyclobutanone, 2-amino-5-vinylcyclopentanone, 2-aryloxy-cyclopropanone, 2-vinyl-[1,2]oxazetidine, 2 vinylaminocyclohexanol, 2-vinylaminocyclopropanone, 2-vinyloxetane, 2-vinyloxy-cyclopropanone, 3-(N-vinylamino)cyclohexanone, 3,5-divinyl furoate, 3-vinylazetidin-2-one, 3 vinylaziridin-2-one, 3-vinylcyclobutanone, 3-vinylcyclopentanone, 3-vinyloxaziridine, 3-vinyloxetane, 3-vinylpyrrolidin-2-one, 2-vinyl-1,3-dioxolane, acrolein diethyl acetal, acrolein dimethyl acetal, 4,4-divinyl-3-dioxolan-2-one, 4-vinyltetrahydropyran, 5-vinylpiperidin-3-one, allylglycidyl ether, butadiene monoxide, butyl-vinyl-ether, dihydropyran-3-one, divinyl butyl carbonate, divinyl carbonate, divinyl crotonate, divinyl ether, divinyl ethylene carbonate, divinyl ethylene silicate, divinyl ethylene sulfate, divinyl ethylene sulfite, divinyl methoxypyrazine, divinyl methylphosphate, divinyl propylene carbonate, ethyl phosphate, methoxy-o-terphenyl, methyl phosphate, oxetan-2-yl-vinylamine, oxiranylvinylamine, vinyl carbonate, vinyl crotonate, vinyl cyclopentanone, vinyl ethyl-2-furoate, vinyl ethylene carbonate, vinyl ethylene silicate, vinyl ethylene sulfate, vinyl ethylene sulfite, vinyl methacrylate, vinyl phosphate, vinyl-2-furoate, vinylcyclopropanone, vinylethylene oxide, β-vinyl-γ-butyrolactone or a mixture of any two or more thereof. In some embodiments, the additive may be a cyclotriphosphazene that is substituted with F, alkyloxy, alkenyloxy, aryloxy, methoxy, allyloxy groups or combinations thereof. For example, the additive may be a (divinyl)-(methoxy)(trifluoro)cyclotriphosphazene, (trivinyl)(difluoro)(methoxy)cyclotriphosphazene, (vinyl)(methoxy)(tetrafluoro)cyclotriphosphazene, (aryloxy)(tetrafluoro)(methoxy)cyclotriphosphazene or (diaryloxy)(trifluoro)(methoxy)cyclotriphosphazene compounds or a mixture of two or more such compounds. In some embodiments, the additive is vinyl ethylene carbonate, vinyl carbonate, or 1,2-diphenyl ether, or a mixture of any two or more such compounds.

Other representative additives include compounds with phenyl, naphthyl, anthracenyl, pyrrolyl, oxazolyl, furanyl, indolyl, carbazolyl, imidazolyl, thiophenyl, fluorinated carbonates, sultone, sulfide, anhydride, silane, siloxy, phosphate or phosphite groups. For example, additives may be phenyl trifluoromethyl sulfide, fluoroethylene carbonate, 1,3,2-dioxathiolane 2,2-dioxide, 1-propene 1,3-sultone, 1,3-propanesultone, 1,3-dioxolan-2-one, 4-[(2,2,2-trifluoroethoxy)methyl], 1,3-dioxolan-2-one, 4-[[2,2,2-trifluoro-1-(trifluoromethyl)ethoxy]methyl]-, methyl 2,2,2-trifluoroethyl carbonate, nonafluorohexyltriethoxysilane, octamethyltrisiloxane, methyltris(trimethylsiloxy)silane, tetrakis(trimethylsiloxy)silane, (tridecafluoro-1,1,2,2-tetrahydrooctyl)triethoxysilane, tris(1H.1H-heptafluorobutyl)phosphate, 3,3,3-trifluoropropyltris(3,3,3-trifluoropropyldimethylsiloxy)silane, (3,3,3-trifluoropropyl)trimethoxysilane, trimethylsilyl trifluoromethanesulfonate, tris(trimethylsilyl) borate, tripropyl phosphate, bis(trimethylsilylmethyl)benzylamine, phenyltris(trimethylsiloxy)silane, 1,3-bis(trifluoropropyl)tetramethyldisiloxane, triphenyl phosphate, tris(trimethylsilyl)phosphate, tris(1H.1H,5H-octafluoropentyl) phosphate, triphenyl phosphite, trilauryl trithiophosphite, tris(2,4-di-tert-butylphenyl) phosphite, tri-p-tolyl phosphite, tris(2,2,3,3,3-pentafluoropropyl)phosphate, succinic anhydride, 1,5,2,4-dioxadithiane 2,2,4,4-tetraoxide, tripropyl trithiophosphate, aryloxpyrrole, aryloxy ethylene sulfate, aryloxy pyrazine, aryloxy-carbazole trivinylphosphate, aryloxy-ethyl-2-furoate, aryloxy-o-terphenyl, aryloxypyridazine, butyl-aryloxy-ether, divinyl diphenyl ether, (tetrahydrofuran-2-yl)-vinylamine, divinyl methoxybipyridine, methoxy-4-vinylbiphenyl, vinyl methoxy carbazole, vinyl methoxy piperidine, vinyl methoxypyrazine, vinyl methyl carbonate-allylanisole, vinyl pyridazine, 1-divinylimidazole, 3-vinyltetrahydrofuran, divinyl furan, divinyl methoxy furan, divinylpyrazine, vinyl methoxy imidazole, vinylmethoxy pyrrole, vinyl-tetrahydrofuran, 2,4-divinyl isooxazole, 3,4 divinyl-1-methyl pyrrole, aryloxyoxetane, aryloxyphenyl carbonate, aryloxy-piperidine, aryloxytetrahydrofuran, 2-aryl-cyclopropanone, 2-diaryloxy-furoate, 4-allylanisole, aryloxy-carbazole, aryloxy-2-furoate, aryloxy-crotonate, aryloxy-cyclobutane, aryloxy-cyclopentanone, aryloxy-cyclopropanone, aryloxy-cycolophosphazene, aryloxy-ethylene silicate, aryloxy-ethylene sulfate, aryloxy-ethylene sulfite, aryloxy-imidazole, aryloxy-methacrylate, aryloxy-phosphate, aryloxy-pyrrole, aryloxyquinoline, diaryloxycyclotriphosphazene, diaryloxy ethylene carbonate, diaryloxy furan, diaryloxy methyl phosphate, diaryloxy-butyl carbonate, diaryloxy-crotonate, diaryloxy-diphenyl ether, diaryloxy-ethyl silicate, diaryloxy-ethylene silicate, diaryloxy-ethylene sulfate, diaryloxyethylene sulfite, diaryloxy-phenyl carbonate, diaryloxy-propylene carbonate, diphenyl carbonate, diphenyl diaryloxy silicate, diphenyl divinyl silicate, diphenyl ether, diphenyl silicate, divinyl methoxydiphenyl ether, divinyl phenyl carbonate, methoxycarbazole, or 2,4-dimethyl-6-hydroxy-pyrimidine, vinyl methoxyquinoline, pyridazine, vinyl pyridazine, quinoline, vinyl quinoline, pyridine, vinyl pyridine, indole, vinyl indole, triethanolamine, 1,3-dimethyl butadiene, butadiene, vinyl ethylene carbonate, vinyl carbonate, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, biphenyl, 1,2-diphenyl ether, 1,2-diphenylethane, o terphenyl, N-methyl pyrrole, naphthalene or a mixture of any two or more such compounds.

In some other embodiments, the electrolyte of the present technology includes an aprotic gel polymer carrier/solvent. Suitable gel polymer carrier/solvents include polyethers, polyethylene oxides, polyimides, polyphosphazines, polyacrylonitriles, polysiloxanes, polyether grafted polysiloxanes, derivatives of the foregoing, copolymers of the foregoing, cross-linked and network structures of the foregoing, blends of the foregoing and the like, to which is added a suitable ionic electrolyte salt. Other gel-polymer carrier/solvents include those prepared from polymer matrices derived from polypropylene oxides, polysiloxanes, sulfonated polyimides, perfluorinated membranes (Nafion resins), divinyl polyethylene glycols, polyethylene glycol-bis-(methyl acrylates), polyethylene glycol-bis(methyl methacrylates), derivatives of the foregoing, copolymers of the foregoing and cross-linked and network structures of the foregoing.

The bicyclophopshate ionic liquids and the electrolytic solution containing the salt are high in ionic conductivity and solubility in organic solvents and are thus suitable for use as an electrolytic solution for electrochemical devices. Examples of electrochemical devices are electric double-layer capacitor, secondary batteries, solar cells of the pigment sensitizer type, electrochromic devices and condensers, and this list is not limitative. Especially suitable as electrochemical devices are electric double-layer capacitor and secondary batteries, such as a lithium ion battery.

In yet another aspect, an electrochemical device is provided that includes a cathode, an anode and an electrolyte including an ionic liquid as described herein. In one embodiment, the electrochemical device is a lithium secondary battery. In some embodiments, the secondary battery is a lithium battery, a lithium-ion battery, a lithium-sulfur battery, a lithium-air battery, a sodium ion battery, or a magnesium battery. In some embodiments, the electrochemical device is an electrochemical cell, such as a capacitor. In some embodiments, the capacitor is an asymmetric capacitor or supercapacitor. In some embodiments, the electrochemical cell is a primary cell. In some embodiments, the primary cell is a lithium/$MnO_2$ battery or Li/poly(carbon monofluoride) battery. In some embodiments, the electrochemical cell is a solar cell.

Suitable cathodes include those such as, but not limited to, a lithium metal oxide, spinel, olivine, carbon-coated olivine, $LiFePO_4$, $LiCOO_2$, $LiNiO_2$, $LiNi_{1-x}Co_yMet_zO_2$, $LiMn_{0.5}Ni_{0.5}O_2$, $LiMn_{0.3}Co_{0.3}Ni_{0.3}O_2$, $LiMn_2O_4$, $LiFeO_2$, $Li_{1+x}Ni_\alpha Mn_\beta Co_\gamma Met'_\delta O_{2-z}F_{z'}$, $A_nB_2(XO_4)_3$ (NASICON), vanadium oxide, lithium peroxide, sulfur, polysulfide, a lithium carbon monofluoride (also known as $LiCF_x$) or mixtures of any two or more thereof, where Met is Al, Mg, Ti, B, Ga, Si, Mn or Co; Met' is Mg, Zn, Al, Ga, B, Zr or Ti; A is Li, Ag, Cu, Na, Mn, Fe, Co, Ni, Cu or Zn; B is Ti, V, Cr, Fe or Zr; X is P, S, Si, W or Mo; and wherein $0 \leq x \leq 0.3$, $0 \leq y \leq 0.5$, $0 \leq z \leq 0.5$, $0 \leq x' \leq 0.4$, $0 \leq \alpha \leq 1$, $0 \leq \beta \leq 1$, $0 \leq \gamma \leq 1$, $0 \leq \delta \leq 0.4$, $0 \leq z' \leq 0.4$ and $0 \leq h' \leq 3$. According to some embodiments, the spinel is a spinel manganese oxide with the formula of $Li_{1+x}Mn_{2-z}Met'''_yO_{4-m}X'_n$, wherein Met''' is Al, Mg, Ti, B, Ga, Si, Ni or Co; X' is S or F; and wherein $0 \leq x \leq 0.3$, $0 \leq y \leq 0.5$, $0 \leq z \leq 0.5$, $0 \leq m \leq 0.5$ and $0 \leq n \leq 0.5$. In other embodiments, the olivine has a formula of $Li_{1+x}Fe_{1-z}Met''_yPO_{4-m}X'_n$, wherein Met'' is Al, Mg, Ti, B, Ga, Si, Ni, Mn or Co; X' is S or F; and wherein $0 \leq x \leq 0.3$, $0 \leq y \leq 0.5$, $0 \leq z \leq 0.5$, $0 \leq m \leq 0.5$ and $0 \leq n \leq 0.5$.

Suitable anodes include those such as lithium metal, graphitic materials, amorphous carbon, $Li_4Ti_5O_{12}$, tin alloys, silicon, silicon alloys, intermetallic compounds, or mixtures of any two or more such materials. Suitable graphitic materials include natural graphite, artificial graphite, graphitized meso-carbon microbeads (MCMB) and graphite fibers, as well as any amorphous carbon materials.

Suitable anodes are composed of active materials such as silicon, silicon alloys; and active materials having a conductive polymer coating around the particles. The polymer can be cyclized using heat treatment at temperatures of 200 to 400° C. and converted to a ladder compound by cross-linking polymer chains. Specific polymers include but are not limited to polyacrylonitrile (PAN) where the cyclization changes the nitrile bond (CEN) to a double bond (C=N).

In some embodiments, the anode and cathode are separated from each other by a porous separator. The separator for the lithium battery often is a microporous polymer film. Examples of polymers for forming films include nylon, cellulose, nitrocellulose, polysulfone, polyacrylonitrile, polyvinylidene fluoride, polypropylene, polyethylene, polybutene, or copolymers or blends of any two or more such polymers. In some instances, the separator is an electron beam-treated micro-porous polyolefin separator. The electron treatment can improve the deformation temperature of the separator and can accordingly enhance the high temperature performance of the separator. Additionally, or alternatively, the separator can be a shut-down separator. The shut-down separator can have a trigger temperature above about 130° C. to permit the electrochemical cells to operate at temperatures up to about 130° C.

The disclosure will be further illustrated with reference to the following specific examples. It is understood that these examples are given by way of illustration and are not meant to limit the disclosure or the claims to follow.

Example 1—Synthesis of Trimethylenechloromethylester

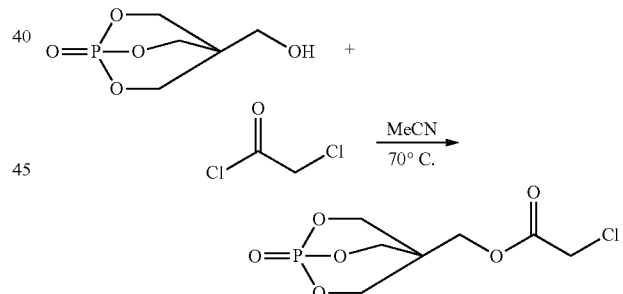

| Reagent | MW | Equiv | Mol | Mass (g) | Density | Volume (mL) | Conc | Yield (calc) |
|---|---|---|---|---|---|---|---|---|
| 2,6,7-Trioxa-1-phosphabicyclo2.2.2octane-4-methanol, 1-oxide | 180.09 | 1.00 | 0.044 | 8.00 | | | | |
| Chloroacetyl chloride | 112.94 | 1.20 | 0.053 | 6.02 | 1.418 | 4.2 | | |
| MeCN | | | | | | 88.8 | 50% | |
| Trioxa-phosphabicyclo-4-chloroacetyl-1-oxide | 256.57 | 1.00 | 0.044 | 11.40 | | | | |

To a 250 ml 3-neck RBF equipped with a stir bar, a thermocouple, a water-cooled condenser was P placed 8 g 2,6,7-Trioxa-1-phosphabicyclo2.2.2octane-4-methanol, 1-oxide in 70 ml MeCN (not completely dissolved). Chloroacetyl chloride in 20 ml MeCN was added to the flask by pipette and no obvious change was observed with the addition of chloroacetyl chloride. The reaction mixture was heated to 70° C. and was stirred at 70° C. for one day. The reaction mixture started to turn clear after stirring at 70° C. for 1 min, and then turned slightly cloudy again after 3 h. Solvent was stripped on a rotavapor and a pale-yellow solid was collected. The solid was washed with DI $H_2O$ and was then slurred in reagent alcohol. The solid was collected by vacuum filtration and washed again with more reagent alcohol.

Collected: 11.4 g, white solid.

$H^+$ NMR: (500 MHz, $CDCl_3$) δ ppm 4.66 (d, 6H), 4.44 (s, 2H), 4.09 (s, 2H).

Example 2—Synthesis of Pyr11COOmethlyene-TMP-Cl

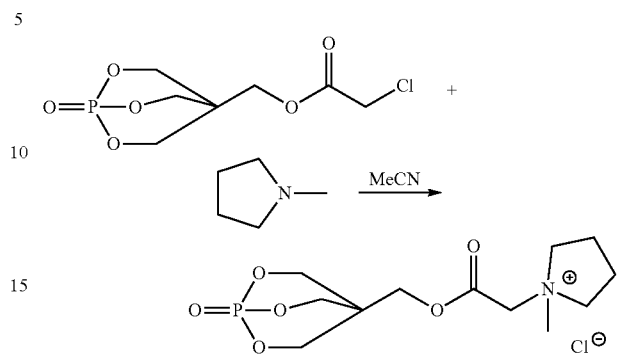

| Reagent | MW | Equiv | Mol | Mass (g) | Density | Volume (mL) | Conc | Yield (calc) |
|---|---|---|---|---|---|---|---|---|
| Trioxa-phosphabicyclo-4-chloroacetyl-1-oxide YW-III-140 | 256.57 | 1.00 | 0.0039 | 1.00 | | | | |
| N-MethylPyrrolidine | 85.15 | 1.05 | 0.0041 | 0.35 | 0.819 | 0.4 | | |
| MeCN | 41.05 | | | | | 7.8 | 0.5 | |
| Pyr11COO1TMP-Cl | 341.72 | 1.00 | 0.0039 | 1.33 | | | | |

To a 20 ml vial equipped with a stir bar was placed Trimethylenechloromethylester in 6 ml MeCN (completely dissolved) and N-methyl pyrrolidine in 2 ml MeCN was added to the flask by pipette. No exotherm or precipitate was observed. While stirring at rt, some white solid started to crash out of solution. The mixture was stirred at rt. for 2 h. White solid was collected by vacuum filtration and was washed with more MeCN.

Collected: 1.33 g, white solid.

Example 3—Synthesis of Pyr11COOmethlyene-TMP-PF6

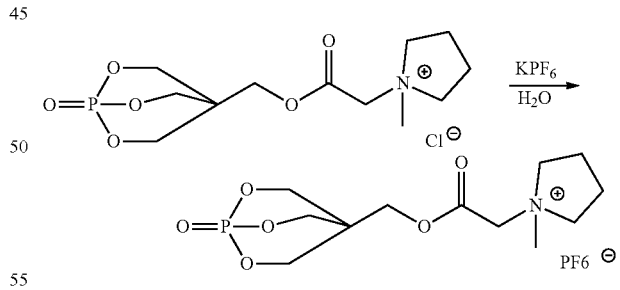

| Reagent | MW | Equiv | Mol | Mass (g) | Density | Volume (mL) | Conc | Yield (calc) |
|---|---|---|---|---|---|---|---|---|
| PCMP-Cl YW-IV-27 | 341.72 | 1.00 | 0.0228 | 7.80 | | | | |
| KPF6 | 184.06 | 1.05 | 0.024 | 4.41 | | #DIV/0! | | |
| H2O | 18 | | | | | 91.3 | 0.25 | |
| PCMP-PF6 | 451.24 | 1.00 | 0.0228 | 10.30 | | | | |

To a 250 ml beaker equipped with a stir bar was placed Pyr11COOmethlyene-TMP-Cl in 42 ml DI. H$_2$O and KPF$_6$ in 50 ml DI. H$_2$O was poured into the beaker. When the two solutions were combined, a cloudy precipitate quickly forms and then became a milky white suspension. The reaction mixture was stirred at rt. for 3 h. White solid crashed out of the solution.

The solid was collected by vacuum filtration and was washed with more DI. H$_2$O.

Collected: white solid, 9.2 g, 88.6%.

Characterization

FTIR: 1766.75; 1312.09; 1208.08; 1042.61; 827.51; 556.62; 459.52 cm$^{-1}$; B.P.>200° C.

H$^+$ NMR: (DMSO-d6) δ ppm 4.69 (d, 6H), 4.50 (s, 2H), 4.15 (s, 2H), 3.65-3.60 (m, 4H), 3.15 (s, 3H), 2.11 (m, 4H).

F$^{19}$ NMR: (DMSO-d6) δ ppm −69.41 (s), −70.92 (s).

P$^{31}$ NMR: (DMSO-d6) δ ppm −7.73 (s), −137.17 (s), −140.68 (s), −144.20 (s), −147.71 (s), −151.22 (s).

Example 4—Synthesis of Pyr11COOmethlyene-TMP-TFSI

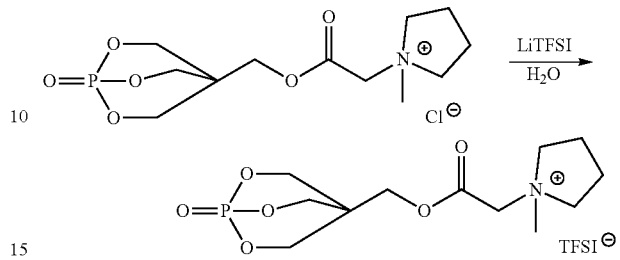

| Reagent | MW | Equiv | Mol | Mass (g) | Density | Volume (mL) | Conc | Yield (calc) |
|---|---|---|---|---|---|---|---|---|
| Pyr11COO1TMP-Cl YW-IV-18 | 341.72 | 1.00 | 0.0039 | 1.33 | | | | |
| LiTFSI | 287.09 | 1.05 | 0.0041 | 1.17 | 1.33 | 0.9 | | |
| H2O | 18 | | | | | 15.6 | 0.25 | |
| Pyr11COO1TMP-TFSI | 586.416 | 1.00 | 0.0039 | 2.28 | | | | |

To a 50 ml RBF equipped with a stir bar was placed Pyr11COOmethlyene-TMP-Cl in 4 ml D.I. H$_2$O. LiTFSI in 4 ml DI. H$_2$O was poured into the flask. When the two solutions were combined, a cloudy precipitate quickly formed and a white oil deposited on the bottom.

The reaction mixture was stirred at rt for overnight. The upper layer was clear and most of the water was decanted. The white oil did not dissolve in DCM or EtOAc, dried on high vacuum.

Collected: white oil then solidified into waxy solid, 1.62 g.

H$^+$ NMR: (DMSO-d6) δ ppm 4.69 (d, 6H), 4.50 (s, 2H), 4.15 (s, 2H), 3.65-3.60 (m, 4H), 3.15 (s, 3H), 2.10 (m, 4H).

Example 5—Synthesis of PP11COOmethlyene-TMP-Cl

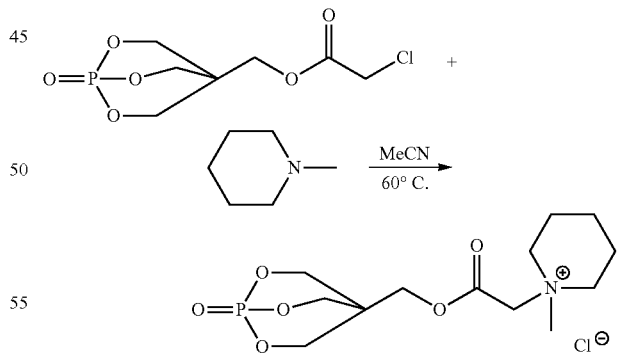

| Reagent | MW | Equiv | Mol | Mass (g) | Density | Volume (mL) | Conc | Yield (calc) |
|---|---|---|---|---|---|---|---|---|
| Trioxa-phosphabicyclo-4-chloroacetyl-1-oxide | 256.57 | 1.00 | 0.0308 | 7.90 | | | | |

| Reagent | MW | Equiv | Mol | Mass (g) | Density | Volume (mL) | Conc | Yield (calc) |
|---|---|---|---|---|---|---|---|---|
| N-MethylPiperidine | 99.17 | 1.05 | 0.0323 | 3.21 | 0.816 | 3.9 | | |
| DCM | | | | | | 61.6 | 0.5 | |
| PP11COO1TMP-Cl | 355.75 | 1.00 | 0.0308 | 10.95 | | | | |

To a 250 ml 3-neck RBF equipped with a stir bar was placed Trimethylenechloromethylester in 42 ml MeCN (not completely dissolved). N-methyl piperidine in 20 ml MeCN was poured into the flask and then the mixture was heated to 60° C. Stirred at 60° C. for ~3.5 h, and some white solid was formed while stirring. The solid was collected by vacuum filtration and was washed with more MeCN. Collected: white solid, 17.3 g.

$H^+$ NMR: (DMSO-d6) δ ppm 4.69 (d, 6H), 4.50 (br, 2H), 4.14 (s, 2H), 3.53-3.47 (m, 4H), 3.19 (s, 3H), 1.83 (m, 4H), 1.56-1.53 (m, 2H).

Example 6—Synthesis of PP11COOmethlyene-TMP-TFSI

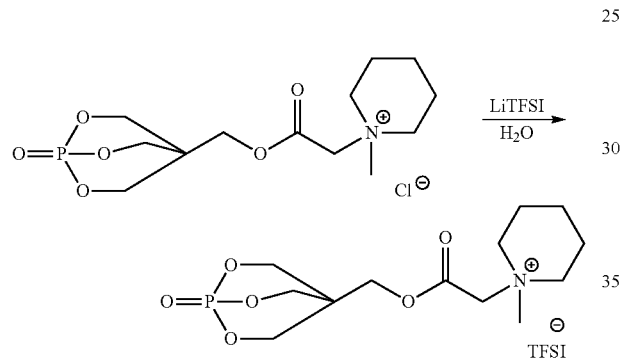

| Reagent | MW | Equiv | Mol | Mass (g) | Density | Volume (mL) | Conc | Yield (calc) |
|---|---|---|---|---|---|---|---|---|
| PP11COO1TMP-Cl | 355.75 | 1.00 | 0.0309 | 11.00 | | | | |
| LiTFSI | 287.09 | 1.05 | 0.0325 | 9.32 | 1.33 | 7.0 | | |
| H2O | 18 | | | | | 61.8 | 0.5 | |
| PCMP-TFSI | 501.28 | 1.00 | 0.0309 | 15.50 | | | | |

To a 500 ml RBF equipped with a stir bar was placed 1 Ig PP11COOmethlyene-TMP-Cl in 42 ml DI. $H_2O$. LiTFSI in 20 ml $H_2O$ was poured into the bottle and a white, milky suspension was formed immediately. A pale, yellow oil mass deposit on the bottom of the flask was observed. The reaction mixture was stirred at rt. for 3.5 h.

Decanted most of the water and the bottom oil layer was washed with fresh DI. $H_2O$ 3 times. The oil layer was dried on a rotavapor and was then dried under high vacuum.

Combined with YW-IV-97, collected: 15.4 g pale yellow solid.
Characterization:

1. FTIR: 1759.58; 1346.93; 1307.24; 1185.13; 1029.14, 1044.89; 857.12; 608.13 $cm^{-1}$, B.P.=50.6-57.9° C.

2. $H^+$ NMR: (DMSO-d6) δ ppm 4.69 (d, 6H), 4.460 (s, 2H), 4.14 (s, 2H), 3.52-3.46 (m, 4H), 3.19 (s, 3H), 1.83 (m, 4H), 1.55-1.54 (m, 2H).

3. $F^{19}$ NMR: (DMSO-d6) δ ppm −78.70 (s).

4. $P^{31}$ NMR: (DMSO-d6) δ ppm −7.72 (s).

Although various embodiments have been depicted and described in detail herein, it will be apparent to those skilled in the relevant art that various modifications, additions, substitutions and the like can be made without departing from the spirit of the disclosure and these are therefore considered to be within the scope of the disclosure as defined in the claims which follow.

In some embodiments, the energy storage device electrolyte includes an additive, at a concentration from 0.01 wt. % to 10 wt. % of the electrolyte.

In some embodiments, electrochemical energy storage device includes an aprotic organic solvent system, at a concentration from 60 wt. % to 90 wt. % of the electrical energy storage device electrolyte.

In some embodiments, the electrochemical energy storage device includes a metal salt, at a concentration from 10 wt. % to 30 wt. % of the electrical energy storage device electrolyte.

In some embodiments, the energy storage device includes at least one additive, at a concentration from 0.01 wt. % to 10 wt. % of the electrical energy storage device electrolyte.

What is claimed:

1. An electrical energy storage device electrolyte comprising:
   a) an aprotic organic solvent system;
   b) a metal salt; and
   c) an ionic liquid compound comprising:
      an anion (A⁻); and
      a cation attached to a bicyclophosphate moiety according to the formula:

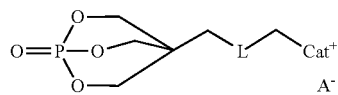

wherein:
   CAT⁺ is a pyrrolidinium, piperdinium, azepanium, sulfonium, phosphonium, pyridine, imidazolium or a 5- or 6-membered heterocyclic ring having 1 to 3 heteroatoms as ring members including nitrogen, oxygen, silicon or sulfur; and
   L is (a) a linker, including a $C_1$-$C_8$ alkyl, alkenyl, alkynyl, alkoxy, ester, carbonyl, phenyl, thioether, sulfoxide, azo or aryl group, wherein any of the carbon or hydrogen atoms therein are optionally further substituted with a halide; (b) O, S, NH, or C; or (c) O, S, NH, or C attached to the linker, with the proviso that when L is an ester group then CAT+ is not an imidazolium.

2. The electrolyte of claim 1, wherein the anion comprises a halide, nitrate, phosphate, imide, borate, aluminate, arsenide, cyanide, thiocyanate, nitrite, benzoate, carbonate, chlorate, chlorite, chromate, sulfate, sulfite, silicate, thiosulfate, chalcogenide, pnictogenide, crystallogenide, oxalate, acetate, formate or hydroxide.

3. The electrolyte of claim 2, wherein the anion comprises Cl, Br, $NO_3$, $PF_6$, TFOP, TFSI, BETI, BOB or $BF_4$.

4. The electrolyte of claim 1, wherein the aprotic organic solvent comprises an open-chain or cyclic carbonate, carboxylic acid ester, nitrite, ether, sulfone, ketone, lactone, dioxolane, glyme, crown ether, siloxane, phosphoric acid ester, phosphate, phosphite mono- or polyphosphazene or mixtures thereof.

5. The electrolyte of claim 1, wherein the cation of the metal salt is an alkali metal.

6. The electrolyte of claim 5, wherein the alkali metal is lithium or sodium.

7. The electrolyte of claim 1, wherein the cation of the metal salt is aluminum or magnesium.

8. The electrolyte of claim 1, further comprising at least one additive.

9. The electrolyte of claim 8, wherein the at least one additive comprises sulfur-containing compounds, phosphorus-containing compounds, boron-containing compounds, silicon-containing compounds, fluorine-containing compounds, nitrogen-containing compounds, compounds containing at least one unsaturated carbon-carbon bond, carboxylic acid anhydrides or the mixtures thereof.

10. The electrolyte of claim 8, wherein the at least one additive is present in a concentration of from 0.01 wt. % to 10 wt. % in the electrolyte.

11. An ionic liquid compound comprising:
    an anion (A⁻); and
    a cation attached to a bicyclophosphate moiety according to the formula:

wherein:
   CAT⁺ is a pyrrolidinium, piperdinium, azepanium, sulfonium, phosphonium, pyridine, imidazolium or a 5- or 6-membered heterocyclic ring having 1 to 3 heteroatoms as ring members including nitrogen, oxygen, silicon or sulfur; and
   L is (a) a linker, including a $C_1$-$C_8$ alkyl, alkenyl, alkynyl, alkoxy, ester, carbonyl, phenyl, thioether, sulfoxide, azo or aryl group, wherein any of the carbon or hydrogen atoms therein are optionally further substituted with a halide; (b) O, S, NH, or C; or (c) O, S, NH, or C attached to the linker, with the proviso that when L is an ester group then CAT+ is not an imidazolium.

12. The compound of claim 11, wherein the anion comprises a halide, nitrate, phosphate, imide, borate, aluminate, arsenide, cyanide, thiocyanate, nitrite, benzoate, carbonate, chlorate, chlorite, chromate, sulfate, sulfite, silicate, thiosulfate, chalcogenide, pnictogenide, crystallogenide, oxalate, acetate, formate or hydroxide.

13. The compound of claim 11, wherein the anion comprises Cl, Br, $NO_3$, $PF_6$, TFOP, TFSI, BETI, BOB or $BF_4$.

14. An electrochemical energy storage device comprising:
    a cathode;
    an anode;
    an electrolyte according to claim 1; and
    a separator.

15. The device of claim 14, wherein the cathode comprises a lithium metal oxide, spinel, olivine, carbon-coated olivine, vanadium oxide, lithium peroxide, sulfur, polysulfide, a lithium carbon monofluoride or mixture thereof.

16. The device of claim 15, wherein the lithium metal oxide is $LiCoO_2$, $LiNiO_2$, $LiNi_xCo_yMet_zO_2$, $LiMn_{0.5}Ni_{0.5}O_2$, $LiMn_{0.1}Co_{0.1}Ni_{0.8}O_2$, $LiMn_{0.2}Co_{0.2}Ni_{0.6}O_2$, $LiMn_{0.3}Co_{0.2}Ni_{0.5}O_2$, $LiMn_{0.33}Co_{0.33}Ni_{0.33}O_2$, $LiMn_2O_4$, $LiFeO_2$, $Li_{1+x'}Ni_\alpha Mn_\mu Co_\gamma Met'_\delta O_{2-z'}F_{z'}$, or $A_n B_2(XO_4)_3$, wherein Met is Al, Mg, Ti, B, Ga, Si, Mn or Co; Met' is Mg, Zn, Al, Ga, B, Zr or Ti; A is Li, Ag, Cu, Na, Mn, Fe, Co, Ni, Cu or Zn; B is Ti, V, Cr, Fe or Zr; X is P, S, Si, W or Mo; and wherein $0 \leq x \leq 0.3$, $0 \leq y \leq 0.5$, $0 \leq z \leq 0.5$, $0 \leq x' \leq 0.4$, $0 \leq \alpha \leq 1$, $0 \leq \beta \leq 1$, $0 \leq \gamma \leq 1$, $0 \leq \delta \leq 0.4$, $0 \leq z' \leq 0.4$ and $0 \leq h' \leq 3$.

17. The device of claim 14, wherein the anode comprises lithium metal, graphitic material, amorphous carbon, $Li_4Ti_5O_{12}$, tin alloy, silicon, silicon alloy, intermetallic compound, or mixture thereof.

18. The device of claim 14, wherein the device comprises a lithium battery, lithium-ion battery, lithium-sulfur battery, lithium-air battery, sodium ion battery, magnesium battery, lithium/$MnO_2$ battery, or Li/poly(carbon monofluoride) battery.

19. The device of claim 14, wherein the device comprises a capacitor or solar cell.

20. The device of claim 14, wherein the device comprises an electrochemical cell.

21. The device of claim 14, wherein the separator comprises a porous separator separating the anode and cathode from each other.

22. The device of claim 21, wherein the porous separator comprises an electron beam-treated micro-porous polyolefin separator or a microporous polymer film comprising nylon, cellulose, nitrocellulose, polysulfone, polyacrylonitrile, polyvinylidene fluoride, polypropylene, polyethylene, polybutene, or co-polymer or blend of any two or more such polymers.

23. The device of claim 14, wherein the aprotic organic solvent system comprises an open-chain or cyclic carbonate, carboxylic acid ester, nitrite, ether, sulfone, ketone, lactone, dioxolane, glyme, crown ether, siloxane, phosphoric acid ester, phosphite, mono- or polyphosphazene or mixture thereof.

24. The device of claim 14, wherein the aprotic organic solvent system is present in a concentration of from 60 wt. % to 90 wt. % in the electrolyte.

25. The device of claim 14, wherein the cation of the metal salt is an alkali metal.

26. The device of claim 25, wherein the alkali metal is lithium or sodium.

27. The device of claim 14, wherein the cation of the metal salt is aluminum or magnesium.

28. The device of claim 14, wherein the metal salt is present in a concentration of from 10 wt. % to 30 wt. % in the electrolyte.

29. The device of claim 14, wherein the electrolyte further comprises at least one additive.

30. The device of claim 29, wherein the at least one additive comprises a sulfur-containing compound, phosphorus-containing compound, boron-containing compound, silicon-containing compound, fluorine-containing compound, nitrogen-containing compound, compound containing at least one unsaturated carbon-carbon bond, carboxylic acid anhydride, epoxide, or mixture thereof.

31. The device of claim 29, wherein the at least one additive is present in a concentration of from 0.01 wt. % to 10 wt. % in the electrolyte.

* * * * *